United States Patent
Lau et al.

(10) Patent No.: US 7,830,597 B2
(45) Date of Patent: Nov. 9, 2010

(54) OPTICAL SYSTEM HAVING SELECTABLE FIELD FOR INSPECTION

(75) Inventors: Siu Wing Lau, Kwai Chung (HK); Zhuan Yun Zhang, Kwai Chung (HK); Yiu Ming Cheung, Kowloon (HK); Chi Ping Hung, Kwai Chung (HK)

(73) Assignee: ASM Assembly Automation Ltd, Hong Kong (HK)

( * ) Notice: Subject to any disclaimer, the term of this patent is extended or adjusted under 35 U.S.C. 154(b) by 321 days.

(21) Appl. No.: 11/853,296

(22) Filed: Sep. 11, 2007

(65) Prior Publication Data

US 2009/0067043 A1    Mar. 12, 2009

(51) Int. Cl.
*G02B 21/00* (2006.01)
(52) U.S. Cl. ........................ 359/368; 359/362
(58) Field of Classification Search ................. 359/676, 359/362, 368
See application file for complete search history.

(56) References Cited

U.S. PATENT DOCUMENTS

| 5,414,562 | A | 5/1995 | Ueda ........................... 359/683 |
| 6,292,306 | B1 | 9/2001 | Betensky ..................... 359/663 |
| 7,006,300 | B2 | 2/2006 | Shinohara .................... 359/689 |
| 7,015,444 | B2 * | 3/2006 | Kawano et al. .......... 250/201.3 |

* cited by examiner

*Primary Examiner*—Joseph Martinez
*Assistant Examiner*—James R Greece
(74) *Attorney, Agent, or Firm*—Ostrolenk Faber LLP

(57) ABSTRACT

An optical system for viewing an object has a plurality of lenses and a main optical axis coincident with the centers of the lenses. The optical system further comprises a low magnification optical subsystem that is operative to view the object at a first magnification and a high magnification optical subsystem that is operative to view the object at a second magnification that is higher than the first magnification. The high magnification optical subsystem has a high magnification optical axis along which light rays that are received from the main optical axis are transmitted. A movable element is locatable on the high magnification optical axis and is movable in directions transverse to the axis for receiving and transmitting light rays.

20 Claims, 9 Drawing Sheets

OPTICAL SYSTEM HAVING SELECTABLE FIELD FOR INSPECTION

FIELD OF THE INVENTION

The present invention relates to an optical system, and in particular to an optical system for inspecting objects at different magnifications.

BACKGROUND AND PRIOR ART

A typical zoom lens system consists of multiple lenses comprising a combination of movable and fixed lens groups. To change the magnification of the system, the movable lens groups move along the optical axis of the system. Each movable lens group moves to a pre-determined position along the optical axis so as to project a magnified image of an object to an image plane in an image pickup element such as a CMOS image sensor or a CCD camera. Thus, the movable lens groups always move in directions parallel to the optical axis.

As the magnification of the lens system changes during zooming, the field of view (FOV) of the zoom lens system changes. When an image is being magnified or it is viewed at higher resolution, the projection angles of the cone of rays from the object received onto the image pickup element are reduced and hence the FOV of the lens system is also reduced. Conversely, the FOV is larger for an image of lower resolution. At higher magnification, rays from the object projecting onto the image pickup element that are closer to the optical axis of the zoom lens system form a focused image since the rays going into the optical system are limited by the angular FOV of the zoom lens system which is in turn controlled by a field stop aperture of the optical system. A field stop aperture is commonly placed along the optical axis of the zoom lens system with its center at the optical axis.

Examples of zoom lens systems are disclosed in the prior art. U.S. Pat. No. 5,414,562 entitled "Zoom Lens" discloses a zoom lens system which achieves high efficiency in addition to a high magnification ratio for use in a compact zoom lens system. The compact zoom lens system comprises five lens groups wherein the second and fourth lens groups are movable along the optical axis so as to vary the magnification of the image. The other lens groups are at fixed positions.

In U.S. Pat. No. 7,006,300 entitled "Three-Group Zoom Lens", first and second lens groups are movable along the optical axis for zooming whereas third and fourth lens groups do not move. Although this zoom lens system may be formed of only three lens groups, it satisfies specified conditions to ensure that the system is compact and favourably corrects various aberrations.

U.S. Pat. No. 6,292,306 entitled "Telecentric Zoom Lens System for Video Based Inspection System" discloses a zoom lens system incorporating telecentricity and consistent precise image resolution to maximize measurement accuracy. This is accomplished through the use of an adjustable aperture stop (telecentric stop) located at a focal point of the optical system and two movable groups of lenses for performing magnification zooming. The zoom lens groups are adjustable along the axial axis of the housing to alter the magnification of the image projected to a camera. A beamsplitter is mounted in the barrel and registers through an opening in the barrel with an external light source to direct light onto the surface of an inspected object, and to pass an image thereof to the zoom lens housing.

Thus, in the aforesaid conventional zoom lens systems, the construction of the optical systems rely on having different sets of movable lens groups moving along the optical axis of the optical system in order to capture images from light rays (paraxial rays) of an object on or in close proximity to the main optical axis. Accordingly, such traditional zoom lens systems can only increase or decrease magnification of images for which the light rays from the object are coming from the region immediately surrounding the optical axis of the lens system. With such conventional optical constructions, one is not able to obtain highly magnified images of the object from light rays remote from the main optical axis. Another limitation of the above conventional zoom lens systems is that the FOV available at higher magnification is narrower than at lower magnification. As a result, the area available for selecting a portion of an object of interest at high magnification is small.

Therefore, it would be desirable to devise an optical construction of a zoom lens system which is capable of magnifying an object and capturing the light rays from the object that are remote from the main optical axis of the lens system.

SUMMARY OF THE INVENTION

It is thus an object of this invention to provide an optical system for obtaining a magnified image of an object by capturing incident light rays that are remote from the optical axis of the optical system. It is a further object of this invention to seek the flexibility to select a small region of the object from a full view of the object that has been obtained at a lower magnification to be magnified at a higher magnification.

Accordingly, the invention provides an optical system for viewing an object, comprising: a plurality of lenses and a main optical axis coincident with the centers of the lenses; a low magnification optical subsystem that is operative to view the object at a first magnification; a high magnification optical subsystem that is operative to view the object at a second magnification that is higher than the first magnification, the high magnification optical subsystem having a high magnification optical axis along which light rays that are received from the main optical axis are transmitted; and a movable element comprised in the high magnification optical subsystem that is locatable on the high magnification optical axis for receiving and transmitting light rays and which is movable in directions transverse to the high magnification optical axis.

It would be convenient hereinafter to describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of a preferred embodiment of the invention when considered with the accompanying drawings, in which.

DETAILED DESCRIPTION OF THE PREFERRED EMBODIMENT OF THE INVENTION

The preferred embodiment of the present invention will be described hereinafter with reference to the accompanying drawings.

Figure 1:
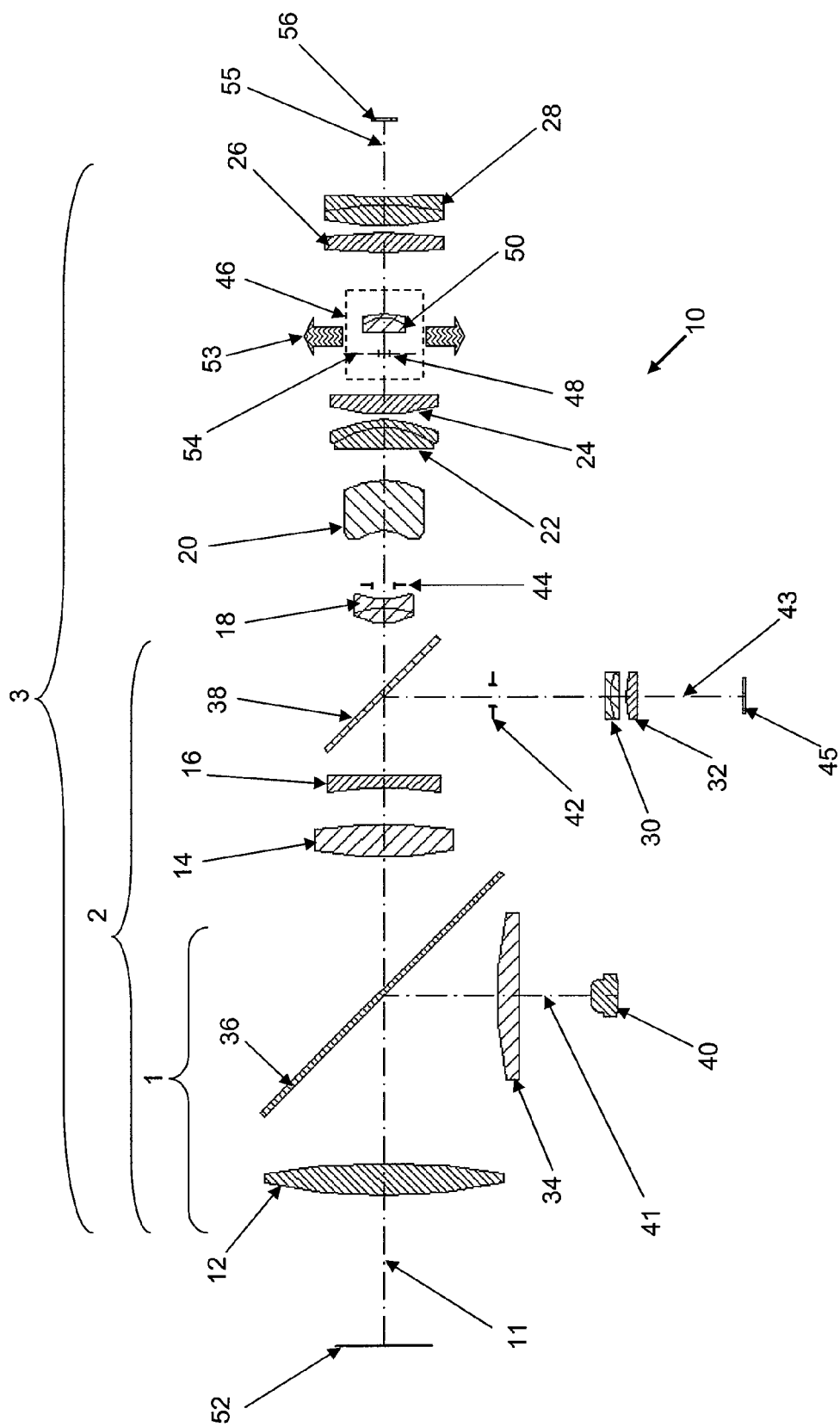
FIG. 1 is a cross-sectional view of an optical system according to the preferred embodiment of the invention illustrating a movable element that is aligned with a main optical axis of the system.

FIG. 1 is a cross-sectional view of an optical system according to the preferred embodiment of the invention illustrating a movable element 46 that is aligned with a main optical axis 11 of the optical system 10. In this configuration, the main optical axis 11 coincides with the centers of a plurality of lenses, and in particular to the optical axis and the center of a field aperture 48 and a movable lens 50 of the movable element 46. The optical system 10 comprises three main optical subsystems, namely (a) a coaxial illumination optical subsystem 1 operative to transmit illumination lighting along the main optical axis 11 onto the object viewed, (b) a low magnification optical subsystem 2 that is operative to view the object at a first magnification, and (c) a high magnification and field selectable optical subsystem 3 that is operative to view the object at a second magnification that is higher than the first magnification.

The coaxial illumination optical subsystem 1 is made up of a first singlet lens 12, a first beamsplitter 36, a second singlet lens 34, and a light source 40. This optical setup provides coaxial illumination for the lens system 10. Exemplary parameters of each optical element in this coaxial illumination optical subsystem 1 are listed in Table-1 as follows:

TABLE 1

Lens Table of the Coaxial Illumination Optics

| Item | R (mm) | d (mm) | n (mm) | v (mm) |
|---|---|---|---|---|
| Object plane 52 | ∞ | — | | |
| First Singlet Lens 12 | 113.16 (front) −131.94 (rear) | 5.9 | 1.5168 | 64.2 |
| Second Singlet Lens 34 | Fresnel lens | 1.5 | Focal length = 12 | |
| Light source 40 | LED of half light emission angle = 55° | | | | where

R is the paraxial radii of curvature of each surface of a lens such that the front of the lens is on the same side as an object and the rear is opposite to the object;

d is the thickness of a lens;

n is the refractive index at a wavelength of 0.5876 μm; and v is the Abbe number at a wavelength of 0.5876 μm.

The coaxial illumination optical subsystem 1 directs light rays from the light source 40 along an illumination optical axis 41 passing through the light source to the object plane 52 to illuminate the object for magnification. The main optical axis 11 is aligned with the longitudinal axis of the optical system 10 according to the preferred embodiment of the present invention. The second singlet lens 34 of the coaxial illumination optical subsystem 1 may be a Fresnel lens, as a Fresnel lens refracts and magnifies light rays, creating a single, concentrated beam of light.

The optical axis of the first beamsplitter 36 is superposed with the main optical axis 11 whereas the optical axis of the second singlet lens 34 and the first beamsplitter 36 is superposed with the illumination optical axis 41. The illumination optical axis 41 is substantially perpendicular to the main optical axis 11 and the axes 11 and 41 meet at the first beamsplitter 36. An LED of half light emission angle of 55° may be used as the light source 40. The light emitted from the light source 40 is collected by the second singlet lens 34 and transmitted along the optical axis of the light source 40. The transmitted light is further reflected by the first beamsplitter 36 which may be a plate beamsplitter inclined at 45° to the main optical axis 11. Alternatively, a cube beamsplitter may be used.

The first beamsplitter 36 re-directs the light from the illumination optical axis 41 to the main optical axis 11 of the optical system 10. Light along the main optical axis 11 passes through the first singlet lens 12 and is focused by the first singlet lens 12 to provide coaxial illumination of the object on the object plane 52. The reflected light from the object is then collected by the first singlet lens 12 and is partially transmitted through the first beamsplitter 36 along the main optical axis 11. The reflected light from the object is then collected by the low magnification optical subsystem 2 and the high magnification optical subsystem 3 of the present invention.

The low magnification optical subsystem 2 comprises the first singlet lens 12, the first beamsplitter 36, a third singlet lens 14, a fourth singlet lens 16, a second beamsplitter 38, an aperture stop 42, a first doublet lens 30 and a fifth singlet lens 32. The low magnification optical subsystem 2 produces a low magnification image of the object on a low magnification image plane 45 where an image pickup sensor or a camera is locatable for installation.

The optical axis of the fifth singlet lens 32, first doublet lens 30, aperture stop 42 and the second beamsplitter 38 is superposed with a low magnification optical axis 43. The main optical axis 11 and the low magnification optical axis 43 meet substantially perpendicularly at the second beamsplitter 38. Exemplary parameters of each optical element of the lens groups for the low magnification optics of present invention are listed in Table-2 as follows:

TABLE 2

Lens Table of the Low Magnification Optics

| Item | R (mm) | d (mm) | n (mm) | v (mm) |
|---|---|---|---|---|
| Object plane 52 | ∞ | — | | |
| First Singlet Lens 12 | 113.16 (front) −131.94 (rear) | 5.9 | 1.5168 | 64.2 |
| Third Singlet Lens 14 | 69.83 (front) −100.29 (rear) | 5.9 | 1.48749 | 70.44 |
| Fourth Singlet Lens 16 | −57.509 (front) 304.75 (rear) | 2 | 1.63636 | 35.35 |
| Aperture stop 42 | ∞ | — | | |
| First Doublet Lens 30 | 80.8 (front) 12.3 (middle) −46.67 (rear) | 1 2 | 1.6727 1.67103 | 32.17 47.29 |
| Fifth Singlet Lens 32 | 20.34 (front) 65.99 (rear) | 2 | 1.67103 | 47.29 |
| Image plane 45 | ∞ | — | | |

An object placed on the object plane 52 reflects light from the coaxial illumination optical subsystem 1. The reflected light from the object is collected by the first singlet lens 12 before transmitting through the first beamsplitter 36, the third singlet lens 14 and fourth singlet lens 16. The light rays passing through the third singlet lens 14 and fourth singlet lens 16 are partially reflected to the optical path along the low magnification optical axis 43 by the second beamsplitter 38 and partially transmitted through the second beamsplitter 38 along the main optical axis 11 into the high magnification optical subsystem 3. The second beamsplitter 38 is preferably inclined at 45° to the main optical axis 11 and may be a plate beamsplitter. Alternatively, a cube beamsplitter may be used. The conical rays of light that are able to pass through the lens group of the first doublet lens 30 and the fifth singlet lens 32 to reach the low magnification image plane 45 are limited by the aperture stop 42. An image of the object will be formed on the low magnification image plane 45.

The specification of the low magnification optics may be as follows:

Optical working distance: 117.18 mm
Magnification: −0.21×
Objective numerical aperture (N.A.): 0.01 where optical working distance is the distance between the object plane 52 and the front surface of the lens 12.

Figure 2:
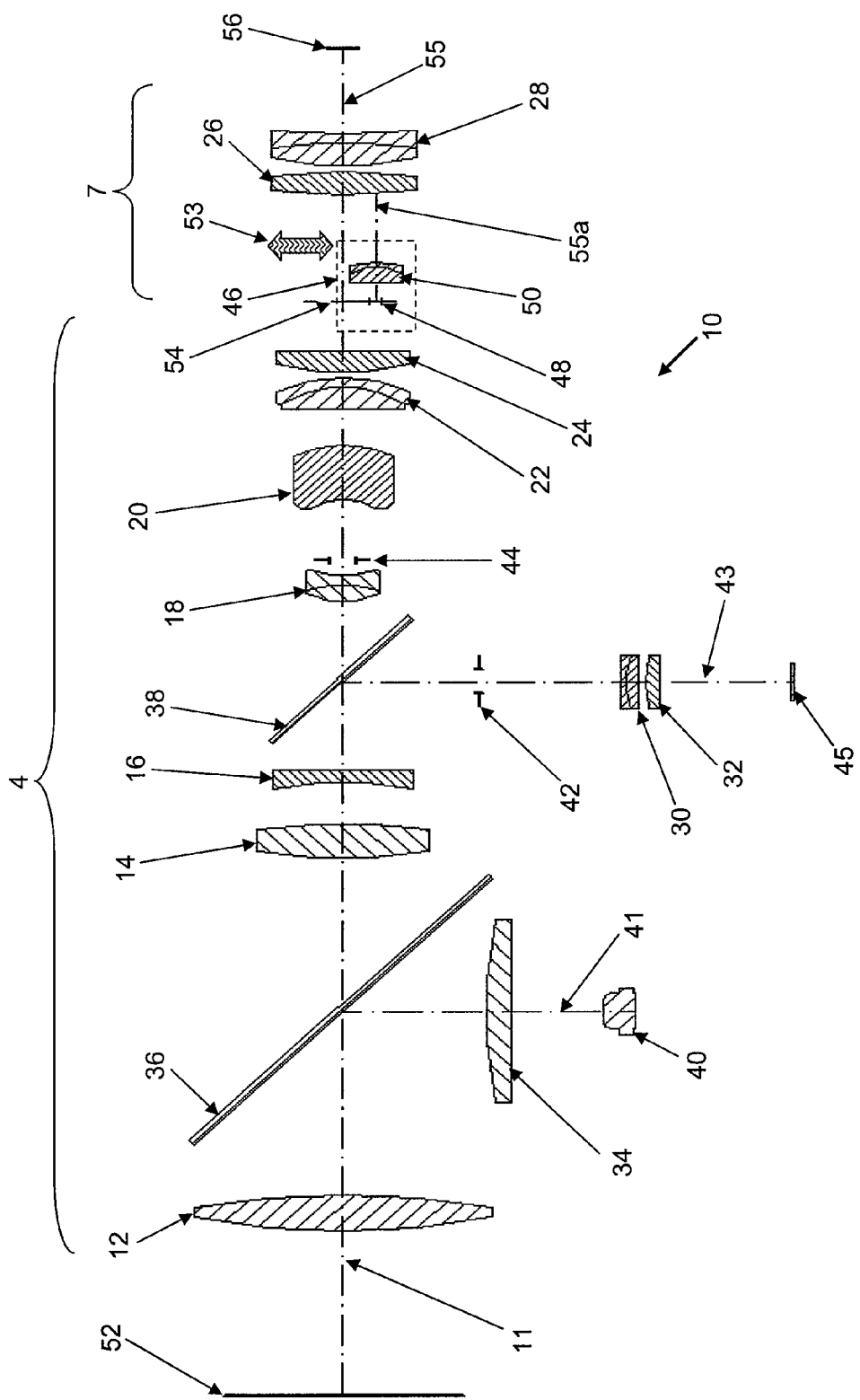
FIG. 2 is a cross-sectional view of the optical system of FIG. 1 illustrating the movable element on an auxiliary optical axis laterally displaced from the main optical axis (or the high magnification optical axis) of the system.
Figure 3:
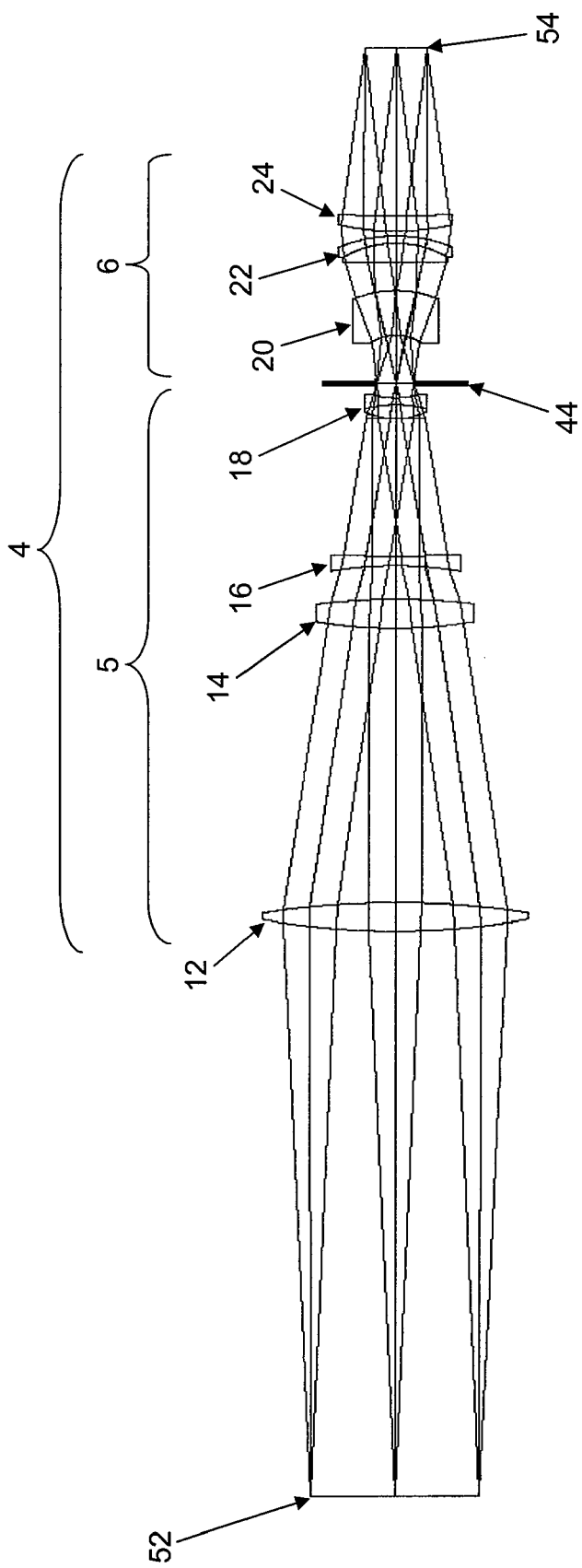
FIG. 3 is a ray trace diagram illustrating rays of light passing through a relay image formation lens group of the optical system of FIG. 1.

The high magnification and field selectable optical subsystem 3 is the major optical subsystem of the present invention and comprises two groups of optical elements, namely a relay image formation lens group 4 and a final image formation lens group 7 (see FIGS. 2 and 3). The relay image formation lens group 4 comprises the first singlet lens 12, the first beamsplitter 36, the third singlet lens 14, the fourth singlet lens 16, the second beamsplitter 38, a second doublet lens 18, an aperture stop 44, a sixth singlet lens 20, a third doublet lens 22 and a seventh singlet lens 24. The high magnification and field selectable optical subsystem 3 has a high magnification axis 55 along which light rays that are received from the main optical axis 11 are transmitted. In the illustrated embodiment, the high magnification optical axis 55 is coincident with the main optical axis 11, although the optical system 10 may alternatively be set up so that the high magnification optical axis is, for instance, perpendicular to the main optical axis 11.

The object plane 52 is located at the focal plane of the first singlet lens 12 so that the rays from the object which pass through the first singlet lens 12 are collimated along the main optical axis 11. This allows parallel rays to pass through the first beamsplitter 36 so that astigmatism introduced by the inclined first beamsplitter 36 can be avoided. The third singlet lens 14 and fourth singlet lens 16 form a Galilean afocal system so that rays passing through the second beamsplitter 38 are parallel to the main optical axis 11 and astigmatism introduced by the second beamsplitter 38 can be avoided. The second doublet lens 18 corrects chromatic aberration, lateral color as well as spherical aberration of the relay image. In this way, the combination of lenses in the relay image formation lens group 4 allows a high quality relay image to be obtained, which is optimized for low distortion, spherical aberration and astigmatism.

The sixth singlet lens 20 is used for minimizing the field curvature of the relay image to ensure that the image is flat on the relay image plane 54. The lens pair of the third doublet lens 22 and seventh singlet lens 24 correct aberrations such as astigmatism and distortion of the image.

The final image formation lens group 7 comprises the movable element 46, which preferably includes a movable field aperture 48 and a movable fourth doublet lens 50, a fixed eighth singlet lens 26 and a fixed fifth doublet lens 28. The first singlet lens 12, the first beamsplitter 36, the third singlet lens 14, the fourth singlet lens 16 and the second beamsplitter 38 are commonly used with the low magnification optical subsystem 2. The optical elements in the relay image formation lens group 4 and the final image formation lens group 7 are aligned with their centers positioned on the high magnification optical axis 55 with the exception of the movable element 46.

The field aperture 48 and the movable fourth doublet lens 50 of the movable element 46 are locatable on the high magnification optical axis 55 for receiving and transmitting light rays and they are movable together in directions transverse to the high magnification optical axis 55. In the position shown, the auxiliary optical axis 55a coincides with the high magnification optical axis 55 and hence to the main optical axis 11. The movable element 46 and the auxiliary optical axis 55a are laterally displaceable from the main optical axis 11 or the high magnification optical axis 55 of the optical system 10 and relocated to a displaced position with the auxiliary optical axis 55a parallel to the main optical axis 11 or the high magnification optical axis 55.

Exemplary parameters of each optical element of the lens groups for relay image formation in the high magnification and field selectable optical subsystem 3 of the present embodiment are listed in Table-3, and exemplary parameters of each optical element of the lens groups for final image formation in the high magnification and field selectable optical subsystem of the present embodiment are listed in Table-4 as shown below:

TABLE 3

Lens Table of the Lens Group for Relay Image Formation in the High Magnification and Field Selectable Optical Subsystem

| Item | R (mm) | d (mm) | n (mm) | v (mm) |
|---|---|---|---|---|
| Object plane 52 | ∞ | | — | |
| First Singlet Lens 12 | 113.16 (front) | 5.9 | 1.5168 | 64.2 |
| | −131.94 (rear) | | | |
| Third Singlet Lens 14 | 69.83 (front) | 5.9 | 1.48749 | 70.44 |
| | −100.29 (rear) | | | |
| Fourth Singlet Lens 16 | −57.509 (front) | 2 | 1.63636 | 35.35 |
| | 304.75 (rear) | | | |
| Second Doublet Lens 18 | 10.787 (front) | 2.9 | 1.57957 | 53.7 |
| | −18.623 (middle) | | | |
| | 13.545 (rear) | 1.5 | 1.58215 | 42.03 |
| Aperture stop 44 | ∞ | | — | |
| Sixth Singlet Lens 20 | −7.397 (front) | 9.24 | 1.75523 | 27.53 |
| | −16.403 (rear) | | | |
| Third Doublet Lens 22 | 1109.9 (front) | 3.9 | 1.48749 | 70.44 |
| | −16.093 (middle) | | | |
| | −22.813 (rear) | 1.5 | 1.71741 | 29.51 |
| Seventh Singlet Lens 24 | 38.123 (front) | 3.2 | 1.78800 | 47.49 |
| | 174.18 (rear) | | | |
| Relay image plane 54 | ∞ | | — | |

TABLE 4

Lens table of the lens group for final image formation in the high magnification and field selectable optical subsystem

| Item | R (mm) | d (mm) | n (mm) | v (mm) |
|---|---|---|---|---|
| Field Aperture 48 | ∞ | | — | |
| Movable Fourth | 21.076 (front) | 1.5 | 1.62231 | 53.14 |

TABLE 4-continued

Lens table of the lens group for final image formation in the high
magnification and field selectable optical subsystem

| Item | R (mm) | d (mm) | n (mm) | v (mm) |
|---|---|---|---|---|
| Doublet Lens 50 | −3.104 (middle) | | | |
| | −6.959 (rear) | 0.7 | 1.71741 | 29.51 |
| Eighth Singlet Lens 26 | 95.254 (front) | 3.9 | 1.47746 | 70.04 |
| | −76.21 (rear) | | | |
| Fifth Doublet Lens 28 | 48.5 (front) | 3.9 | 1.65160 | 58.40 |
| | −60.45 (middle) | | | |
| | 168.5 (rear) | 1.5 | 1.74077 | 27.76 |
| High Magnification Image Plane 56 | ∞ | | — | |

A relay image is formed on the relay image plane 54 where the field aperture 48 is located. The field aperture 48 and the movable fourth doublet lens 50 of the movable element 46 are preferably the only movable components in the lens system 10 and they are mounted on a laterally movable positioning table 53 such as an X-Y translation table, which moves these optical elements on a plane perpendicular to the high magnification optical axis 55 of the optical system 10. A field of interest of the relay image is selected for magnification by the movable fourth doublet lens 50, eighth singlet lens 26 and fifth doublet lens 28. The magnified image is formed on the high magnification image plane 56 where an image sensor or camera is locatable.

The optical magnification and the field of view of the low magnification optics are determined by the position and parameters of the low magnification optical subsystem 2 as well as the position and size of the aperture stop 42. The field of view of the lower magnification optics is relatively bigger than the field of view of the higher magnification optics and therefore the image formed by the lower magnification optical subsystem 2 covers a larger area of the object. However, more details of the object are available from the high magnification image which is obtained by the high magnification and field selectable optical subsystem 3. Therefore, the optical system 10 of the preferred embodiment of the present invention provides the flexibility of viewing a larger area of the object that was viewed under the low magnification optics and more details of a selectable area of interest under the high magnification optics.

FIG. 2 is a cross-sectional view of the optical system of FIG. 1 illustrating the movable element 46 on the auxiliary optical axis 55a laterally displaced from the main optical axis 11 (or the high magnification optical axis 55) of the system 10. The X-Y translation table shifts the movable element 46 laterally from the main optical axis 11 as illustrated in this figure so as to select a field of interest of the relay image on plane 54 for magnification.

When the movable element 46 is laterally displaced, the auxiliary optical axis 55a is moved to a position that is displaced from the main optical axis 11, such as a position within 4.6 mm from the main optical axis 11. This permits selection of the field of interest of the relay image by the high magnification optics from an area remote from the main optical axis 11 without moving the whole optical system 10 or the object. The longitudinal spacing as well as their optical centers between the field aperture 48 and the movable fourth doublet lens 50 are fixed regardless of their lateral positions away from the main optical axis 11. In addition, the field aperture 48 moves laterally on a plane which is superposed with the relay image plane 54.

The specification of the relay image formation lens group in the high magnification and field selectable optical subsystem may be:
  Optical working distance: 117.18 mm (object plane to the front surface of the lens 12)
  Magnification Mr: −0.37×
  Objective numerical aperture (N.A.): 0.039
The specification of the final image formation lens group in the high magnification and field selectable optical subsystem may be:
  Magnification Mf: −5.2×
  Numerical aperture (N.A.) of field aperture: 0.11
  Field aperture diameter: 1.2 mm FIG. 3 is a ray trace diagram illustrating rays of light passing through a relay image formation lens group 4 of the optical system 10 of FIG. 1 with the first beamsplitter 36 and the second beamsplitter 38 removed for clarity. The relay image formation lens group 4 comprises an entrance lens group 5 and an exit lens group 6, which are separated by an aperture stop 44. The entrance lens group 5 comprises the first singlet lens 12, the third singlet lens 14, the fourth singlet lens 16 and the second doublet lens 18. The sixth singlet lens 20, the third doublet lens 22 and the seventh singlet lens 24 constitute the exit lens group 6.

A telecentric design is used for the entrance lens group 5 on the object side of the optical system 10 to ensure a high quality image suitable for inspection and metrology applications. The aperture stop 44 acts as a telecentric stop and is positioned at a common focal plane between the entrance lens group 5 and exit lens group 6. Therefore, the common focal point of these lens groups is located at the center of the aperture stop 44 on the high magnification optical axis 55 of the system. The chief ray from the object plane will then be parallel to the high magnification optical axis 55 and passes through the entrance lens group intercepting the high magnification optical axis 55 of the optical system 10 at the center of the aperture stop 44. Similarly, the chief ray passing through the centre of the aperture stop 44 exits the exit lens group 6 in a direction parallel to the high magnification optical axis 55 at the relay image plane 54. Therefore, the designs of both the entrance and exit lens groups 5, 6 respectively of the relay image formation lens group are telecentric lenses.

The chief ray exiting the exit lens group 6 of the relay image formation lens group 4 is also parallel to the auxiliary optical axis 55a of the movable element 46 of the final image formation lens group 7 as well as parallel to the high magnification optical axis 55. Thus, the light rays are collimated onto the relay image plane 54. The movable element 46 which comprise the field aperture 48 and the movable fourth doublet lens 50 are located behind the relay image plane 54.

The design of the relay image formation lens group 4 in the high magnification and field selectable optical subsystem 3 provides a high quality distortion-free relay image of the object on the relay image plane 54. The relay image obtained ensures a good quality final image on the high magnification image plane 56 despite laterally moving the movable element 46 away from the high magnification optical axis 55.

A selected region of the relay image can be picked up by the final image formation lens group 7 and a high magnification image is projectable onto the high magnification image plane 56 of the optical system 10 where an image pickup sensor or a camera is installed.

The brightness of the image remains more or less the same when the movable fourth doublet lens 50 moves in the axis perpendicular to the high magnification optical axis 55. The movable field aperture 48 is located on the relay image plane 54 whereas the movable fourth doublet lens 50 has first and second sides, and is positioned at a location where the front focal plane of its first side is located on the relay image plane 54 and field aperture 48. The light is collimated when it passes through the movable fourth doublet lens 50 to emerge from its second side. The fixed lenses 26 and 28 collect the collimated light from the movable fourth doublet lens 50 and focus the highly magnified final image onto the high magnification image plane 56. The lenses 26 and 28 are selected such that the distortion on the final image is minimal.

Figure 4:
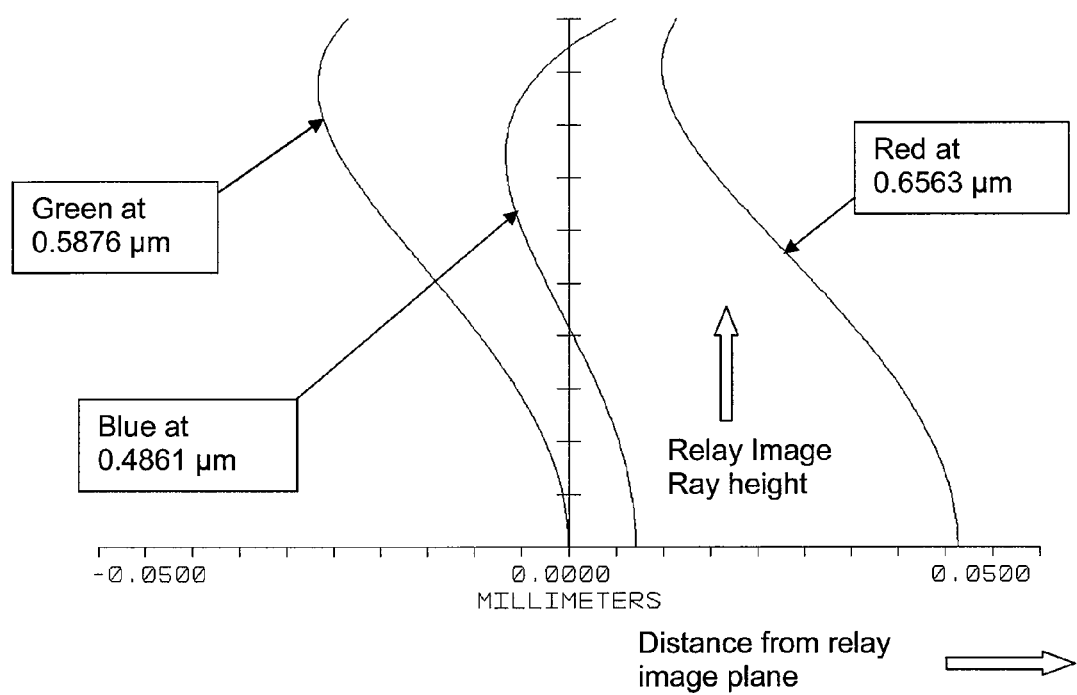
FIG. 4 illustrates the longitudinal spherical aberration of the relay image formation lens group of FIG. 3.

FIG. 4 illustrates the longitudinal spherical aberration of the relay image formation lens group 4 of FIG. 3. It is a graphical representation of the focal distance of the relay image measured from the relay image plane 54 for different incident ray heights entering the aperture at the plane of the aperture stop 44 measured from the main optical axis 11 of the optical system 10. The ray at the maximum height parallel to the optical axis is the ray passing through the edge of the aperture stop 44, that is, the marginal ray height. Blue, green and red light rays at standard wavelengths of 0.4861 µm, 0.5876 µm and 0.6563 µm respectively are illustrated. Taking the plot for the green light (wavelength of 0.4861 µm) as a reference, this graph illustrates that there is no spherical aberration when the incident green ray coincides with the main optical axis 11 such that the ray height is zero. A clear image is therefore captured on the relay image plane 54. When the ray height increases, the images formed will be shifted away from the relay image plane 54 and will appear blur. It is also noted that the extent of spherical aberration is different for the red and blue light rays since different wavelengths are refracted differently by the lens.

Figure 5:
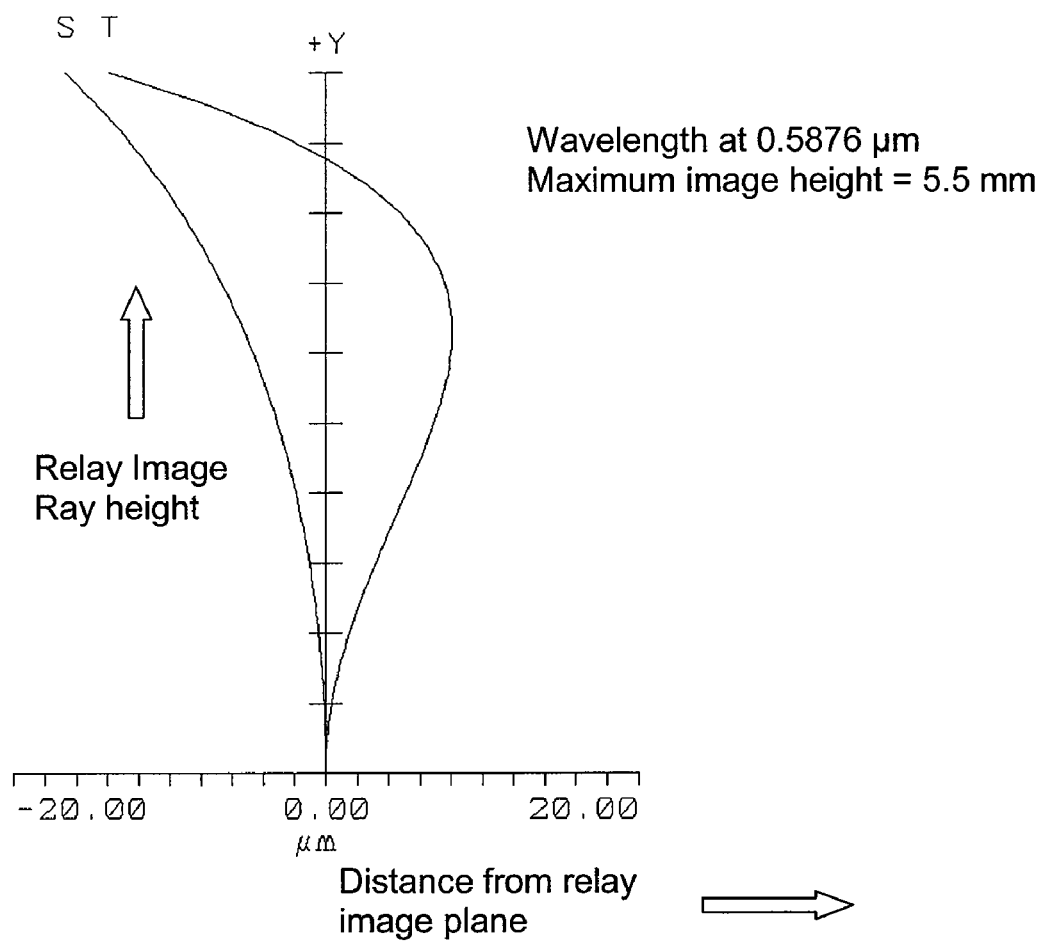
FIG. 5 shows the field curvature and astigmatism of the relay image formation lens group of FIG. 3.

FIG. 5 shows the field curvature and astigmatism of the relay image formation lens group 4 of FIG. 3. The field curvature and astigmatism of a relay image at various image heights for a green light of wavelength 0.5876 µm are shown. The relay image height is measured from the optical axis on the relay image plane 54 with a maximum height of 5.5 mm. The horizontal scale of the graph is the focal distance of the relay image from the relay image plane 54 being measured. The curve S relates to the sagittal focal surface of the relay image and the curve T relates to the tangential focal surface of the relay image. The graphs illustrate the extent of deviation from a plane image for the relay images as a result of field curvature and astigmatism of the lens. The deviation from the plane image for the relay image on the tangential focal surface is greater than the deviation for the relay image on the sagittal focal surface.

Figure 6:
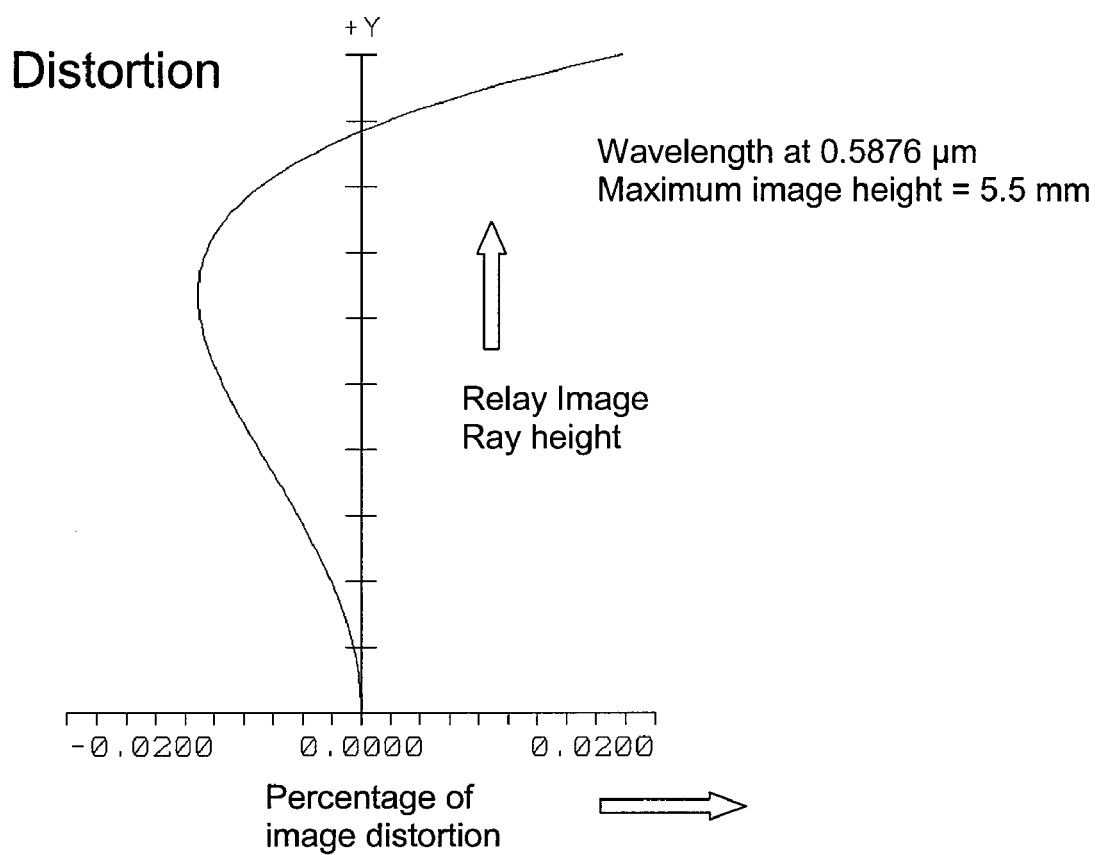
FIG. 6 shows the distortion of the relay image formation lens group of FIG. 3.

FIG. 6 shows the distortion of the relay image formation lens group 4 of FIG. 3. This graph illustrates the distortion of the relay image for green light of wavelength 0.5876 µm up to a maximum image height of 5.5 mm. The percentage of image distortion due to changes to the relay image height on the relay image plane 54 is plotted. This graph illustrates that the distortion increases with an increase in the relay image height. At the maximum image height of 5.5 mm, the percentage of image distortion is still within an acceptable range for inspection purposes.

Figure 7:
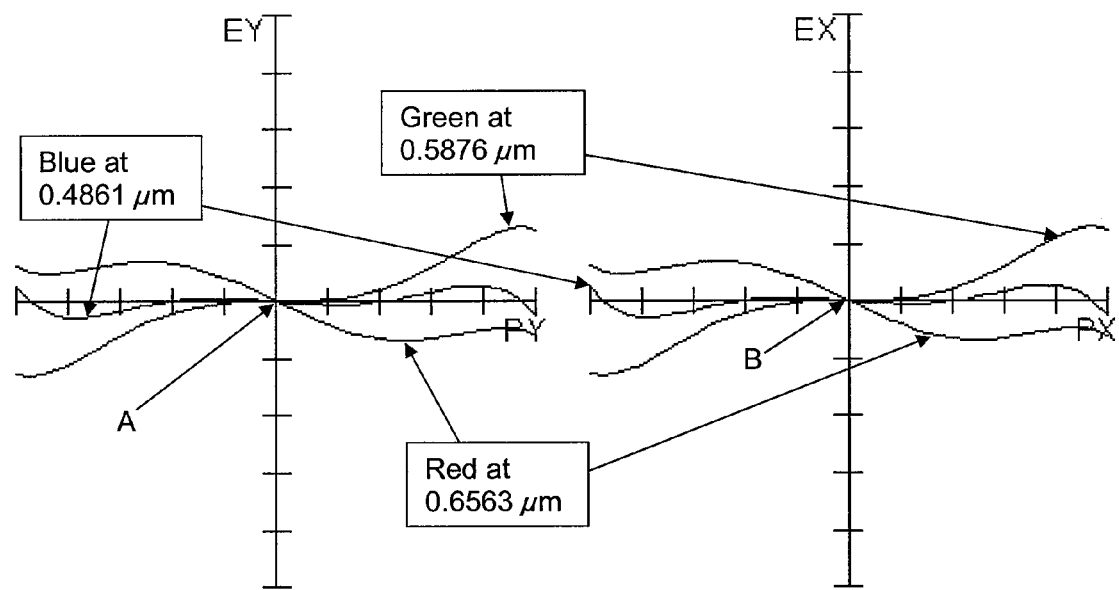
FIG. 7 shows the ray intercept plots of the aberration for the relay image formation lens group of FIG. 3 for a relay image height of 0 mm.

FIG. 7 shows the ray intercept plots of the aberration for the relay image formation lens group 4 of FIG. 3 for a relay image height of 0 mm. Three colored light rays (blue, green and red) along two transverse directions X and Y which are perpendicular to the main optical axis 11 are indicated. EX and EY are the X and Y components of the image aberration in orthogonal directions perpendicular to the optical axis which indicate the extent of image blur. PX and PY are the normalized entrance pupil coordinates along X and along Y directions for EX and EY respectively. Points A and B in the plots illustrate the ideal situation where there are no aberrations for all the light rays going through the center of the field stop 44 on the main optical axis 11.

Figure 8:
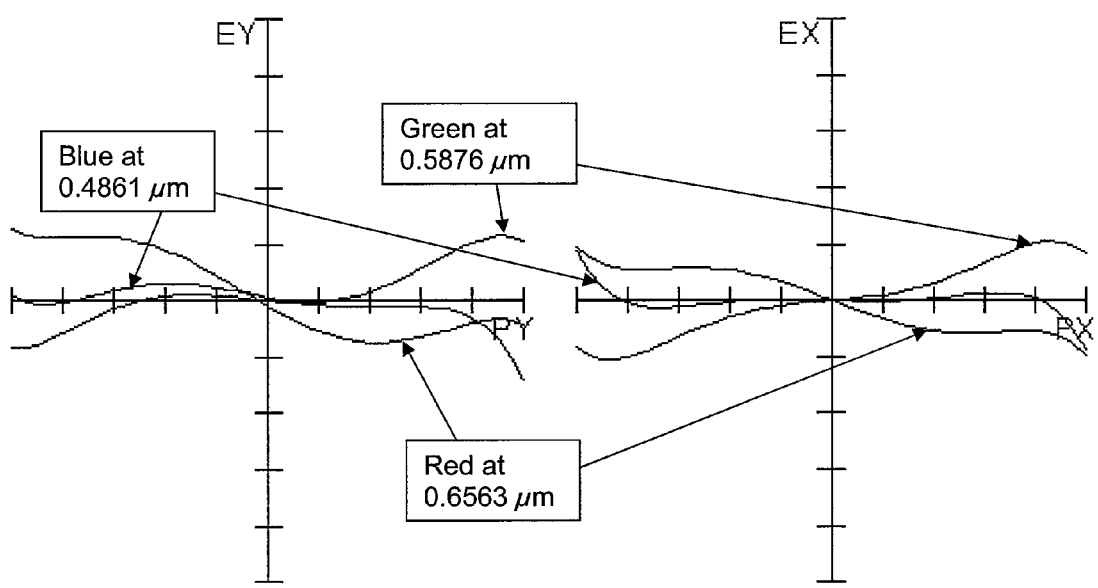
FIG. 8 shows the ray intercept plots of the aberration for the relay image formation lens group of FIG. 3 for a relay image height of 3.89 mm.

FIG. 8 shows the ray intercept plots of the aberration for the relay image formation lens group 4 of FIG. 3 for a relay image height of 3.89 mm. The plots illustrate that the Y component of the aberration is more significant for a relay image height of 3.89 mm when the light rays going through the entrance pupil are displaced from the optical axis, as compared to the plots of FIG. 7 for the relay image height at zero. However, increases in the relay image height cause little change to the X component of the aberration.

Figure 9:
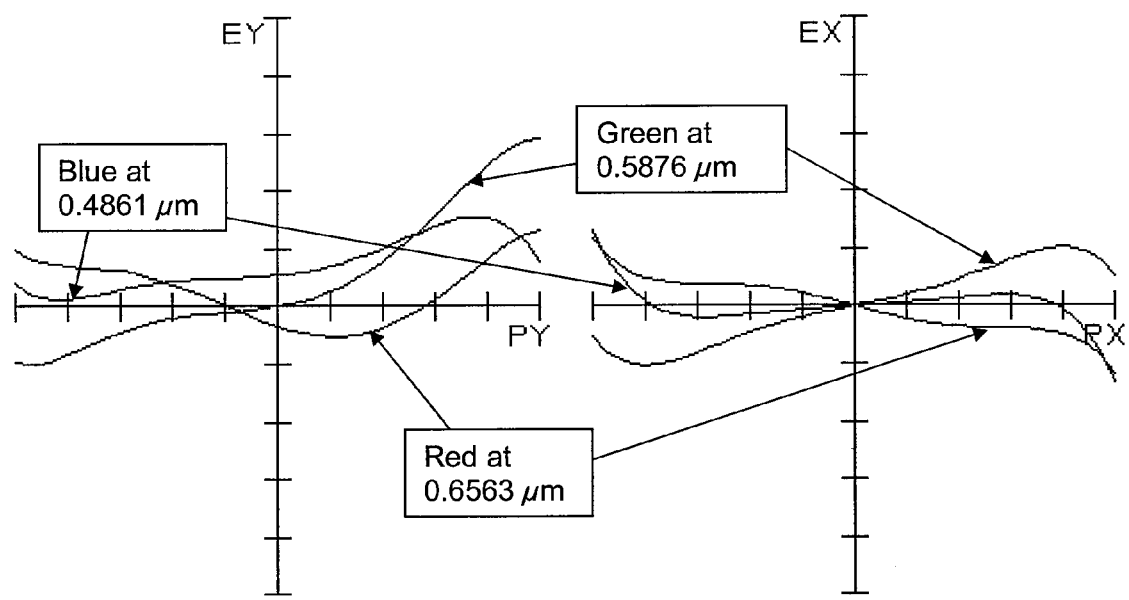
FIG. 9 shows the ray intercept plots of the aberration for the relay image formation lens group of FIG. 3 for a relay image height of 5.5 mm.

FIG. 9 shows the ray intercept plots of the aberration for the relay image formation lens group 4 of FIG. 3 for a relay image height of 5.5 mm. It is apparent from the plots that the Y component of the aberration is more significant than the X component as compared to the plots of FIGS. 7 and 8 when the relay image heights are 0 and 3.89 mm respectively. Increases in image height cause little change to the X component of the aberration but larger changes to the Y component of the aberration. This may probably due to the present of the beamsplitter along the main optical path. The extent of aberration does not significantly affect the use of these images obtained at a relay image height of up to 5.5 mm for inspection purposes. Although there is some distortion of the relay images as the relay image height increases, it has been found that the optical system according to the preferred embodiment of the invention ensures that the image distortion can be minimized for inspection purposes.

The quality of the images formed on the relay image plane 54 depends on the diameter of the aperture stop 44 which is determined by the numerical aperture (N.A.) for the entrance lens group. Thus, it is important to calculate the desirable optical resolution of the optical system for a given magnification. The required N.A. of the optical system 10 is then available when the desirable optical resolution is obtained. The desired optical resolution determines the aperture stop 44 of the entrance lens group of the relay image formation lens group as follows:

$$R = <Rs/M$$

where
R is the desired optical resolution of the optical system;
Rs is resolution of the image pickup optical sensor; and
M is the optical magnification of the optical system of the present invention.

Further, $$M = Mr * M_f$$
$$= 1.924$$

where
$Mr = -0.37$ is the optical magnification of the relay image formation lens group; and
$M_f = -5.2$ is the optical magnification of the final image formation lens group.

The numerical aperture of the aperture stop 44 of the entrance lens group of the relay image formation lens group can be calculated by:

$$\text{Objective N.A} \sim 0.61 * \lambda/R$$

where
$\lambda$ is the wavelength of light; and
R is the desirable optical resolution The objective numerical aperture (N.A) for the optical system 10 according to the preferred embodiment is 0.039.

Finally, the diameter of the aperture stop 44 can be determined by the following equation:

$$\phi A_2 \sim \text{Objective N.A.} * 2 * f_o$$

where $\phi A_2$ is the diameter of aperture stop 44; and $f_o$ is the effective focal length of objective lens (the entrance lens group of the relay image formation lens group) which is equal to 84.3 mm.

The diameter of the field aperture is determined by the size (or diameter) of the active region of the image pickup sensor or the camera and the magnification of the final image formation lens group. The diameter of the field aperture is given by:

$$\phi F \geq \phi S / M_f$$

where $\phi F$ is the diameter of the field aperture;

$\phi S$ is the diameter of the image pickup sensor; and $M_f$ is the magnification of the final image formation lens group.

It should be appreciated that the optical system 10 of the present invention provides a lower magnification image of the object from one optical path and a higher magnification image of the object from another optical path. The FOV of the lower magnification image covers more areas of the object, whereas more details of the object are available from the higher magnification image. In the preferred embodiment, lenses comprised in the low magnification optical axis 43 and high magnification optical axis 55 are fixed relative to one another except lens 50 of the movable element 46. Furthermore, the relative axial distances between the plurality of lenses along the respective low and high magnification optical axes 43, 55 as well as other lenses located along the main optical axis 11 are relatively fixed, thus there may be no need for lenses that are movable along the main optical axis as found in prior art optical systems.

A major advantage of the said optical system 10 is that the high magnification image of the object does not have to necessarily originate from the region immediately surrounding the optical axis of the system. The positioning table 53 can be used to move the movable element 46 so as to select an area on the object to be magnified onto the high magnification image plane 56, which may be detected by an image pickup sensor or camera. Thus, the user can inspect a low magnification image from the low magnification optical subsystem 2 and then move the movable element 46 to select the area of interest (which can be remote from the main optical axis 11 of the optical system 10) to magnify it without moving the whole optical system 10 or moving the object. This advantage is not possible with a traditional zoom optical system.

The invention described herein is susceptible to variations, modifications and/or additions other than those specifically described and it is to be understood that the invention includes all such variations, modifications and/or additions which fall within the spirit and scope of the above description.

The invention claimed is:

1. An optical system for viewing an object, the optical system comprising:
   a plurality of lenses having a main optical axis coincident with centers of the lenses;
   a low magnification optical subsystem comprising at least one lens of the plurality of lenses and configured to view the object at a first magnification;
   a high magnification optical subsystem positioned on a same side of the object as the low magnification optical subsystem, and comprising the plurality of lenses and configured to view the object at a second magnification that is higher than the first magnification, the high magnification optical subsystem having a high magnification optical axis along which light rays received from the main optical axis are transmitted; and
   the high magnification optical subsystem comprising a movable element having a first side and a second side opposite and away from the first side, the movable element being configured to be positioned on the high magnification optical axis for receiving light rays on the first side and for transmitting the light rays out of the second side in a straight line in a direction parallel to the high magnification optical axis, and the entire movable element is configured to move along a plane in directions that are transverse to the high magnification optical axis.

2. The optical system as claimed in claim 1, wherein the high magnification optical axis is coincident with the main optical axis.

3. The optical system as claimed in claim 1, further comprising a coaxial illumination subsystem configured to transmit illumination lighting along the main optical axis onto the object.

4. The optical system as claimed in claim 3, wherein the coaxial illumination subsystem further comprises a Fresnel lens.

5. The optical system as claimed in claim 3, wherein the coaxial illumination subsystem further comprises:
   an illumination optical axis passing through an illumination light source, the illumination optical axis being substantially perpendicular to the main optical axis, and
   a beamsplitter positioned along the main optical axis and configured to redirect light rays from the illumination optical axis onto the main optical axis.

6. The optical system as claimed in claim 1, wherein the low magnification optical subsystem has a low magnification optical axis perpendicular to the main optical axis, and further comprises a beamsplitter for reflecting light rays from the main optical axis onto the low magnification optical axis.

7. The optical system as claimed in claim 6, wherein the low magnification optical subsystem further comprises an aperture stop positioned along the low magnification optical axis for controlling the light rays reaching a low magnification image plane where an image sensor is locatable.

8. The optical system as claimed in claim 1, wherein the high magnification optical subsystem further comprises a relay image formation lens group configured to collimate light rays onto a relay image plane.

9. The optical system as claimed in claim 8, wherein the movable element includes a movable field aperture positioned on the relay image plane.

10. The optical system as claimed in claim 8, wherein the relay image formation lens group further comprises an entrance lens group and an exit lens group, and an aperture stop positioned at a common focal plane between the entrance and exit lens groups.

11. The optical system as claimed in claim 10, wherein the exit lens group is configured to transmit exiting light rays parallel to the high magnification optical axis.

12. The optical system as claimed in claim 1, wherein the movable element is configured to be movable so as to be positioned at a selected region of an image viewed at the first magnification by the low magnification optical subsystem such that an image viewed at the second magnification is projectable onto a high magnification image plane of the high magnification optical subsystem where an image sensor is locatable.

13. The optical system as claimed in claim 1, wherein the movable element comprises a movable field aperture and a movable lens element that are configured to move together when the movable element is moved.

14. The optical system as claimed in claim 13, wherein the movable lens element comprises a doublet lens.

15. The optical system as claimed in claim 13, wherein an axis of the movable field aperture and movable lens element are displaceable onto an auxiliary optical axis parallel to the high magnification optical axis.

16. The optical system as claimed in claim 13, wherein the first side of the movable element has a focal point located at the field aperture, and the second side is configured to collimate light rays emerging from the second side.

17. The optical system as claimed in claim 1, including a positioning table, wherein the movable element is mounted on the positioning table, the positioning table being configured to drive the movable element along a plane perpendicular to the high magnification optical axis.

18. The optical system as claimed in claim 1, wherein lenses comprised in the high magnification optical subsystem and the low magnification optical subsystem are fixed in position relative to one another except for a lens of the movable element.

19. The optical system as claimed in claim 1, wherein relative axial distances between of the high and low magnification optical subsystems are fixed.

20. The optical system as claimed in claim 1, wherein relative axial distances between lenses of the plurality of lenses are fixed.

* * * * *